(12) United States Patent
Han et al.

(10) Patent No.: US 11,070,771 B2
(45) Date of Patent: Jul. 20, 2021

(54) ACTIVE/INACTIVE STATE DETECTION METHOD AND APPARATUS

(71) Applicant: Advanced New Technologies Co., Ltd., George Town (KY)

(72) Inventors: Zhe Han, Hangzhou (CN); Xiaobo Zhang, Hangzhou (CN); Sihai Yao, Hangzhou (CN); Jun Wu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/889,622

(22) Filed: Jun. 1, 2020

(65) Prior Publication Data
US 2020/0296335 A1  Sep. 17, 2020

Related U.S. Application Data

(63) Continuation of application No. PCT/CN2019/073120, filed on Jan. 25, 2019.

(30) Foreign Application Priority Data

Feb. 8, 2018 (CN) .......................... 201810127142.2

(51) Int. Cl.
*H04N 7/18* (2006.01)
*H04N 5/232* (2006.01)
*G06K 9/00* (2006.01)

(52) U.S. Cl.
CPC ......... *H04N 7/188* (2013.01); *G06K 9/00771* (2013.01); *H04N 5/23203* (2013.01); *H04N 5/232411* (2018.08)

(58) Field of Classification Search
CPC ............. H04N 7/188; H04N 5/232411; H04N 5/23203; G06K 9/0077
See application file for complete search history.

(56) References Cited

U.S. PATENT DOCUMENTS

2002/0049728 A1*  4/2002  Kaku ................. H04N 5/77
2009/0262977 A1* 10/2009  Huang ............... G06T 7/20
                                                          382/103
(Continued)

FOREIGN PATENT DOCUMENTS

CN   103778577   5/2014
CN   105915784   8/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ahmed A Berhan
(74) *Attorney, Agent, or Firm* — Fish & Richardson P.C.

(57) ABSTRACT

The present application discloses active/inactive state detection methods, where the method is performed by a monitoring and detecting system, and includes the following: monitoring a distance between an object and a target object within a distance detection range; when the distance between the object and the target object satisfies a first predetermined condition, sending a first instruction to an image acquisition system corresponding to the distance detection range, so as to activate the image acquisition system to obtain an image in an image acquisition area of the image acquisition system; and determining a state of the target object based on a recognition result obtained by performing object recognition on the image in the image acquisition area, where the state of the target object includes an active state and/or an inactive state. In the implementations of the present application, whether a predetermined object is active and/or inactive can be accurately determined, (Continued)

system power consumption can be effectively reduced, and application needs can be satisfied.

24 Claims, 7 Drawing Sheets

(56) References Cited

U.S. PATENT DOCUMENTS

2016/0180712 A1    6/2016   Rosen et al.
2018/0014754 A1*   1/2018   Gray ..................... A61B 5/743

FOREIGN PATENT DOCUMENTS

| | | |
|---|---|---|
| CN | 107278301 | 10/2017 |
| CN | 107378949 | 11/2017 |
| CN | 107589707 | 1/2018 |
| CN | 108427914 | 8/2018 |
| EP | 2219134 | 8/2010 |
| TW | 200945215 | 11/2009 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln No. PCT/CN2019/073120, dated Apr. 25, 2019, 12 pages (with partial English translation).

Extended Search Report in European Application No. 19751705.5, dated Dec. 22, 2020, 9 pages.

Vogel et al, "Interactive Public Ambient Displays: Transitioning from Implicit to Explicit, Public to Personal, Interaction with Muliple Users", University of Toronto: Dept of Computer Science, Oct. 1, 2004, 10 pages.

\* cited by examiner

ACTIVE/INACTIVE STATE DETECTION METHOD AND APPARATUS

CROSS-REFERENCE TO RELATED APPLICATIONS

The present application claims priority to Chinese Patent Application No. 201810127142.2, filed on Feb. 8, 2018 and entitled "ACTIVE/INACTIVE STATE DETECTION METHOD AND APPARATUS", which is incorporated herein by reference in its entirety.

TECHNICAL FIELD

The present application relates to the field of computer technologies, and in particular, to active/inactive state detection methods and apparatuses.

BACKGROUND

With the development of computer technologies, the intelligence level of various application scenarios is increasing.

In some application scenarios such as cafeterias, vending machines, automatic access control, etc., the monitoring system needs to be able to automatically determine whether the predetermined object is active or inactive, so that the service system can provide appropriate services based on the active and/or inactive state of the predetermined object.

Therefore, methods for automatically detecting the active/inactive state of the predetermined object are urgently needed.

SUMMARY

Implementations of the present application provide active/inactive state detection methods and apparatuses, and corresponding application systems, to automatically detect an active/inactive state of a predetermined object.

The following technical solutions are used in the implementations of the present application:

According to a first aspect, an implementation of the present application provides an active/inactive state detection method, where the method is performed by a monitoring and detecting system, and includes the following: monitoring a distance between an object and a target object within a distance detection range; when the distance between the object and the target object satisfies a first predetermined condition, sending a first instruction to an image acquisition system corresponding to the distance detection range, so as to activate the image acquisition system to obtain an image in an image acquisition area of the image acquisition system; and determining a state of the target object based on a recognition result obtained by performing object recognition on the image in the image acquisition area, where the state of the target object includes an active state and/or an inactive state.

Optionally, in the active/inactive state detection method provided in the first aspect of the implementations of the present application, the first predetermined condition includes at least one of the following: the distance between the object and the target object is less than a first predetermined threshold; a statistical value of the distance between the object and the target object within a first predetermined time period is less than a second predetermined threshold; a difference in the distances between the object and the target object at a first predetermined time interval is greater than a third predetermined threshold; the distance between the object and the target object is greater than a fourth predetermined threshold; or a statistical value of the distance between the object and the target object within a second predetermined time period is greater than a fifth predetermined threshold.

Optionally, in the active/inactive state detection method provided in the first aspect of the implementations of the present application, before the determining a state of the target object based on a recognition result obtained by performing object recognition on the image in the image acquisition area, the method further includes the following: sending the image in the image acquisition area to an object recognition system, so that the object recognition system performs object recognition on the image in the image acquisition area to obtain the recognition result; and receiving the recognition result returned by the object recognition system.

Optionally, in the active/inactive state detection method provided in the first aspect of the implementations of the present application, the object recognition system is a cloud object recognition system.

Optionally, in the active/inactive state detection method provided in the first aspect of the implementations of the present application, the recognition result includes at least one of the following: a judgment conclusion indicating whether the image in the image acquisition area includes a predetermined object; or the quantity of predetermined objects included in the image in the image acquisition area.

Optionally, in the active/inactive state detection method provided in the first aspect of the implementations of the present application, the determining a state of the target object based on a recognition result obtained by performing object recognition on the image in the image acquisition area includes at least one of the following: when the image in the image acquisition area includes the predetermined object, determining that the state of the target object is the active state; when the image in the image acquisition area does not include the predetermined object, determining that the state of the target object is the inactive state; when the quantity of the predetermined objects included in the image in the image acquisition area is greater than zero, determining that the state of the target object is the active state; or when the quantity of the predetermined objects included in the image in the image acquisition area is zero, determining that the state of the target object is the inactive state.

Optionally, in the active/inactive state detection method provided in the first aspect of the implementations of the present application, after the determining a state of the target object, the method further includes the following: sending the state of the target object to a service system, so that the service system determines a service process corresponding to the state of the target object.

Optionally, in the active/inactive state detection method provided in the first aspect of the implementations of the present application, after the determining a state of the target object, the method further includes the following: sending a second instruction to the image acquisition system corresponding to the distance detection range, so as to shut down the image acquisition system or switch the image acquisition system to a standby mode.

Optionally, in the active/inactive state detection method provided in the first aspect of the implementations of the present application, the sending a second instruction to the image acquisition system corresponding to the distance detection range includes the following: when the distance between the object and the target object satisfies a second predetermined condition, sending the second instruction to the image acquisition system corresponding to the distance detection range, where the second predetermined condition includes: a difference in the distances between the object and the target object at a second predetermined time interval is less than a sixth predetermined threshold.

Optionally, in the active/inactive state detection method provided in the first aspect of the implementations of the present application, after the determining a state of the target object, the method further includes the following: recording the state of the target object; and determining the first predetermined condition based on the state of the target object.

According to a second aspect, an implementation of the present application provides an active/inactive state detection method, where the method is performed by an image acquisition system, and includes the following: receiving a first instruction, where the first instruction is sent by a monitoring and detecting system when a distance between an object and a target object satisfies a first predetermined condition, the object is within a distance detection range of the monitoring and detecting system, and the distance detection range corresponds to the image acquisition system; and obtaining an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

Optionally, in the active/inactive state detection method provided in the second aspect of the implementations of the present application, after the obtaining an image in an image acquisition area of the image acquisition system, the method further includes: receiving a second instruction, where the second instruction is sent by the monitoring and detecting system after determining the state of the target object; and shutting down the image acquisition system or switching the image acquisition system to a standby mode based on the second instruction.

According to a third aspect, an implementation of the present application provides an active/inactive state detection apparatus, where the apparatus is applied to a monitoring and detecting system, and includes the following: a distance monitoring module, configured to monitor a distance between an object and a target object within a distance detection range; a first instruction sending module, configured to: when the distance between the object and the target object satisfies a first predetermined condition, send a first instruction to an image acquisition system corresponding to the distance detection range, so as to activate the image acquisition system to obtain an image in an image acquisition area of the image acquisition system; and a state determining module, configured to determine a state of the target object based on a recognition result obtained by performing object recognition on the image in the image acquisition area, where the state of the target object includes an active state and/or an inactive state.

According to a fourth aspect, an implementation of the present application provides an active/inactive state detection apparatus, where the apparatus is applied to an image acquisition system, and includes the following: a first instruction receiving module, configured to receive a first instruction that is sent by a monitoring and detecting system when a distance between an object and a target object satisfies a first predetermined condition, where the object is within a distance detection range of the monitoring and detecting system, and the distance detection range corresponds to the image acquisition system; and an image acquisition module, configured to obtain an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

According to a fifth aspect, an implementation of the present application provides an electronic device, including the following: a processor; and a memory, configured to store a computer executable instruction, where when executed, the executable instruction enables the processor to perform the following operations: monitoring a distance between an object and a target object within a distance detection range; when the distance between the object and the target object satisfies a first predetermined condition, sending a first instruction to an image acquisition system corresponding to the distance detection range, so as to activate the image acquisition system to obtain an image in an image acquisition area of the image acquisition system; and determining a state of the target object based on a recognition result obtained by performing object recognition on the image in the image acquisition area, where the state of the target object includes an active state and/or an inactive state.

According to a sixth aspect, an implementation of the present application provides a computer readable storage medium, where the computer readable storage medium stores one or more programs, and when the one or more programs are executed by an electronic device that includes multiple applications, the electronic device is enabled to perform the following operations: monitoring a distance between an object and a target object within a distance detection range; when the distance between the object and the target object satisfies a first predetermined condition, sending a first instruction to an image acquisition system corresponding to the distance detection range, so as to activate the image acquisition system to obtain an image in an image acquisition area of the image acquisition system; and determining a state of the target object based on a recognition result obtained by performing object recognition on the image in the image acquisition area, where the state of the target object includes an active state and/or an inactive state.

According to a seventh aspect, an implementation of the present application provides an electronic device, including the following: a processor; and a memory, configured to store a computer executable instruction, where when executed, the executable instruction enables the processor to perform the following operations: receiving a first instruction, where the first instruction is sent by a monitoring and detecting system when a distance between an object and a target object satisfies a first predetermined condition, the object is within a distance detection range of the monitoring and detecting system, and the distance detection range corresponds to the image acquisition system; and obtaining an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

According to an eighth aspect, an implementation of the present application provides a computer readable storage medium, where the computer readable storage medium stores one or more programs, and when the one or more programs are executed by an electronic device that includes multiple applications, the electronic device is enabled to perform the following operations: receiving a first instruction, where the first instruction is sent by a monitoring and detecting system when a distance between an object and a target object satisfies a first predetermined condition, the object is within a distance detection range of the monitoring and detecting system, and the distance detection range corresponds to the image acquisition system; and obtaining an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

According to a ninth aspect, an implementation of the present application provides an application system, including a monitoring and detecting system, an image acquisition system, an object recognition system, and a service system, where the monitoring and detecting system is configured to: monitor a distance between an object and a target object within a distance detection range; when the distance between the object and the target object satisfies a first predetermined condition, send a first instruction to an image acquisition system corresponding to the distance detection range, so as to activate the image acquisition system to obtain an image in an image acquisition area of the image acquisition system; and determine a state of the target object based on a recognition result obtained by performing object recognition on the image in the image acquisition area, where the state of the target object includes an active state and/or an inactive state; the image acquisition system is configured to: receive a first instruction, where the first instruction is sent by the monitoring and detecting system when the distance between the object and the target object satisfies the first predetermined condition, the object is within the distance detection range of the monitoring and detecting system, and the distance detection range corresponds to the image acquisition system; and obtain the image in the image acquisition area of the image acquisition system, so that the monitoring and detecting system determines the state of the target object based on the recognition result obtained by performing object recognition on the image in the image acquisition area, where the state of the target object includes the active state and/or the inactive state; the object recognition system is configured to: receive the image in the image acquisition area and perform object recognition on the image in the image acquisition area to obtain the recognition result; and return the recognition result; and the service system is configured to receive the state of the target object and determine a service process corresponding to the state of the target object.

The previous at least one technical solution used in the implementations of the present application can achieve the following beneficial effects:

In the implementations of the present application, the image acquisition system can obtain the image in the image acquisition area, and then perform object recognition on the acquired image, so as to determine the state of the target object based on the recognition result. Therefore, whether a predetermined object is active and/or inactive can be accurately determined. In addition, the distance between the object within the distance detection range and the target object is monitored, and the image acquisition system is activated to obtain the image in the image acquisition area of the image acquisition system only when the detected distance satisfies the first predetermined condition. As such, system power consumption can be effectively reduced, and application needs can be satisfied.

BRIEF DESCRIPTION OF DRAWINGS

The accompanying drawings described here are intended to provide a further understanding of the present application, and constitute a part of the present application. The example implementations of the present application and the descriptions of the example implementations are intended to explain the present application, and do not constitute an undue limitation on the present application. In the drawings:

FIG. 1 is a schematic structural diagram illustrating an application system that an implementation of the present application applies to;

DESCRIPTION OF IMPLEMENTATIONS

To make the objectives, technical solutions, and advantages of the present application clearer, the following clearly describes the technical solutions of the present application with reference to specific implementations and accompanying drawings of the present application. Clearly, the described implementations are merely some rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

Figure 1:
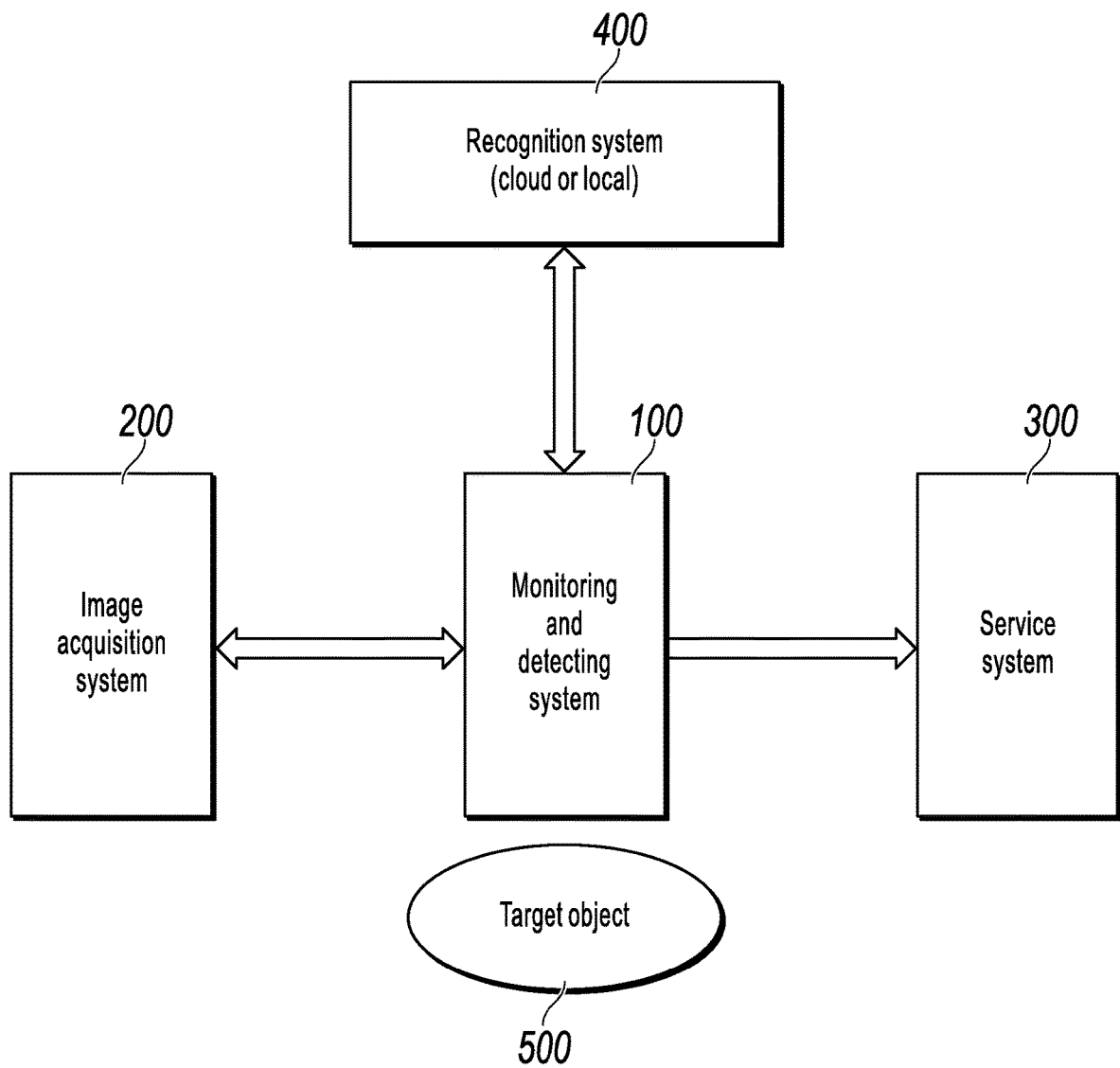

FIG. 1 is a schematic structural diagram illustrating an application system that can automatically detect an active/inactive state of a predetermined object. It can be understood that the application system can be applied to multiple application scenarios, for example, cafeterias, vending machines, automatic access control, etc.

The application system can include a monitoring and detecting system 100, an image acquisition system 200, and a service system 300. The monitoring and detecting system 100 can monitor a distance between an object and a target object 500 within a distance detection range, so that the image acquisition system is activated to acquire an image when the distance satisfies a specific condition. After being activated, the image acquisition system 200 can acquire an image in an image acquisition area, so as to determine whether the image acquisition area includes a predetermined object, based on a recognition result of performing object recognition on the image. The monitoring and detecting system 100 and/or the image acquisition system 200 can send the image in the image acquisition area to a recognition system 400 for object recognition. If the image in the image acquisition area includes the predetermined object, it can be determined that the target object is in an active state. If the image in the image acquisition area does not include the predetermined object, it can be determined that the target object is in an inactive state. On this basis, the state information of the target object can be further sent to the service system 300, so that the service system 300 determines a corresponding service process based on the state of the target object.

It is worthwhile to note that, the recognition system 400 used to perform object recognition on the image can be either a local recognition system in the target object or a remote cloud recognition system.

Figure 2:
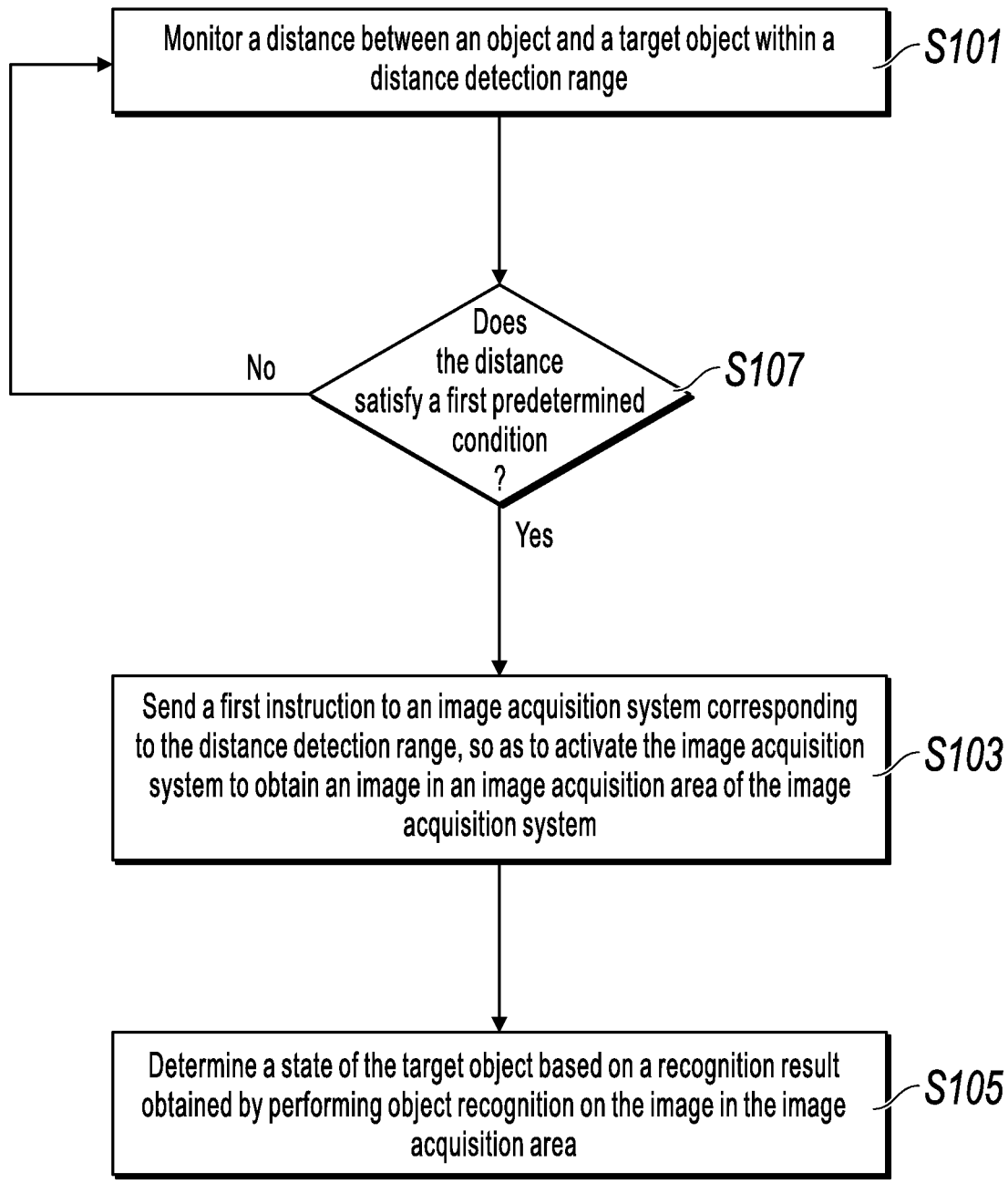
FIG. 2 is a schematic flowchart illustrating an active/inactive state detection method performed by a monitoring and detecting system, according to an implementation of the present application.

As shown in FIG. 2, the active/inactive state detection method performed by the monitoring and detecting system can include the following steps:

S101: Monitor a distance between an object and a target object within a distance detection range.

In S101, the monitoring and detecting system can use a distance sensing module to detect the distance between the object within the distance detection range of the distance sensing module and the target object in real time. Specifically, The distance sensing module can be disposed at the target object, and the distance between the object and the target object can be obtained by detecting the distance between the object and the distance sensing module.

Optionally, the distance sensing module can use one or more of an ultrasonic ranging sensor, a laser ranging sensor, an infrared ranging sensor, etc., provided that precision of distance monitoring and specific needs of application scenarios can be satisfied.

The ultrasonic ranging sensor includes an emitting unit for emitting ultrasonic waves and a receiving unit for receiving ultrasonic echoes. The distance between two objects can be measured by using the ultrasonic echo ranging principle. An emitted ultrasonic wave will rebound after it collides with a blocking object (which can be an object or a human body). Therefore, the ultrasonic ranging sensor can calculate the distance traveled by the ultrasonic wave using the time difference between the emitting of the ultrasonic wave and the receiving of the ultrasonic echo, and then obtain the distance between the blocking object and the ultrasonic ranging sensor. The ultrasonic ranging sensor has the advantages of small blind zone, accurate measurement, no contact, and low cost, etc.

During specific implementation, the ultrasonic ranging sensor can be disposed at the target object to monitor the distance between the target object and the object within the distance detection range. The specific location and direction of the ultrasonic ranging sensor can be adjusted so that the emitting unit emits the ultrasonic wave in a certain direction and starts timing at the emitting moment. The ultrasonic wave travels through the air and rebounds immediately after it collides with an obstacle. As such, the receiving unit receives a reflected wave (equivalent to an ultrasonic echo) and then stops the timing. Assume that the velocity of the ultrasonic wave is v, and the time difference between the emitting of the ultrasonic wave by the emitting unit and the receiving of the ultrasonic echo by the receiving unit is t. In such case, the distance between the emitting point (equivalent to the location of the target object) and the obstacle (equivalent to the detected object) can be expressed as S=v*t/2. Although the velocity of the ultrasonic wave is related to the temperature, the velocity changes by less than 1% when the temperature changes by 5° C. Therefore, the velocity of the ultrasonic wave can be considered constant when the temperature does not change much. Such precision is usually sufficient to satisfy the needs of application scenarios such as indoor cafeterias and vending machines.

Besides the ultrasonic ranging sensor, the laser ranging sensor and/or the infrared ranging sensor can also be used to measure and monitor the distance. The light ranging principle is similar to the acoustic ranging principle. The main difference lies in the time difference between the emitting of light and the receiving of light. The laser ranging sensor depends on light waves that are severely affected by sunlight and other light, and may be more easily interfered at daytime. Therefore, the laser ranging sensor is more suitable for use at night, such as night-time access control. When the light is insufficient, the infrared ranging sensor can be selected to achieve higher ranging precision.

It can be understood that, multiple ranging sensors can be used in combination to satisfy the needs of different measurement precision and application scenarios, which is not limited in the present implementation of the present application.

Figure 3:
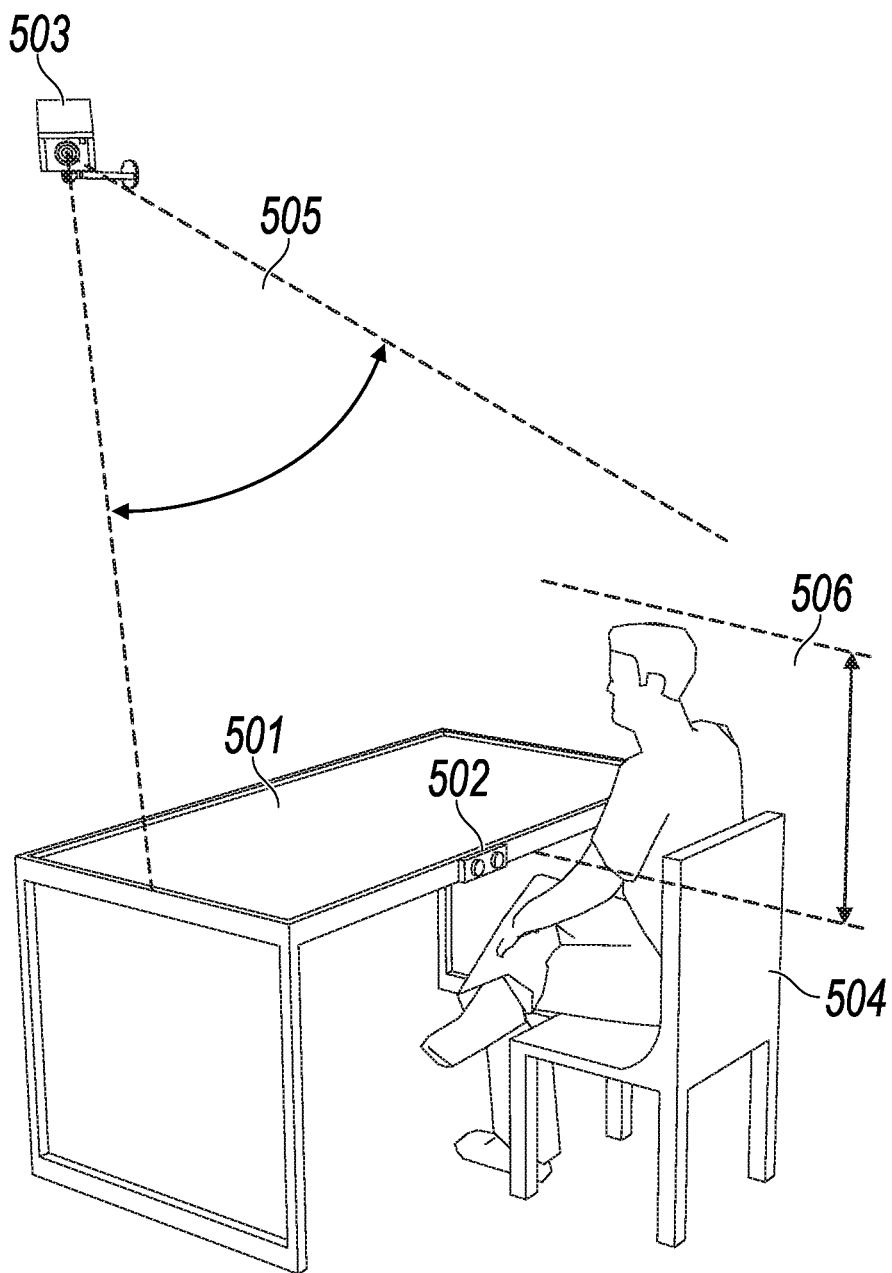
FIG. 3 is a schematic diagram illustrating an implementation scenario in which an implementation of the present application is applied to a cafeteria.

For example, the monitoring and detecting system is applied to the application scenario of a cafeteria. The target object can be a dining table 501 (or a self-service buffet cabinet) in the cafeteria, as shown in FIG. 3. Whether to initiate a corresponding service process is determined by detecting whether a human body (which can be understood as a predetermined object) approaches or moves away from the dining table.

Before S101 is performed, the ultrasonic ranging sensor 502 (or another type of ranging sensor) can be disposed at the target object (i.e., the dining table 501). The direction in which the emitting unit emits ultrasonic waves is changed to a direction in which the human body is most likely to approach or move away from the dining table. For example, the ultrasonic ranging sensor 502 can be disposed around the dining table. Optionally, the ultrasonic ranging sensor 502 can be installed on the side of the dining table, and the ultrasonic waves are emitted horizontally. When the human body approaches or moves away from the dining table, the human body falls within the distance detection range 506 of the ultrasonic ranging sensor 502. It can be understood that, to ensure that the human body can be detected when approaching or moving away from the dining table in all directions, the ranging sensor can be disposed around the dining table.

In some cases, signals (acoustic waves or light waves) emitted by multiple ranging sensors may interfere with each other. For example, ranging sensors disposed on the dining tables on both sides of an aisle may have an overlapping distance detection range. The ultrasonic waves emitted by one ranging sensor may be received by another ranging sensor, thus affecting the ranging accuracy. To alleviate such interference, multiple methods can be used. For example, multiple ranging sensors can be controlled to emit signals by turns. For another example, a detection value whose distance exceeds a specific threshold can be discarded automatically during distance judgment. For another example, a ranging sensor for emitting a signal at a current moment can be determined based on a reservation state of a user (which may be a diner here). For example, the user makes a reservation through code scanning when entering the cafeteria, to determine a table number (which can be an ID of a target object) for dining. In such case, only the dining table corresponding to the dining table number is activated to emit a signal.

S103: When the distance between the object and the target object satisfies a first predetermined condition, send a first instruction to an image acquisition system corresponding to the distance detection range, so as to activate the image acquisition system to obtain an image in an image acquisition area of the image acquisition system.

The distance between the object and the target object can be detected by performing S101. Before S103 is performed, the condition for activating the image acquisition system, i.e., the first predetermined condition, can be determined in advance, and then S107 is performed to determine whether the distance between the object and the target object satisfies the first predetermined condition. If the first predetermined condition is satisfied, S103 is further performed. If the first predetermined condition is not satisfied, S101 is performed again to continue monitoring.

In different application scenarios, the first predetermined condition can have different meanings. For example, the first predetermined condition can include at least one of the following:

(1) The distance between the object and the target object is less than a first predetermined threshold.

Such predetermined condition can be understood as follows: The distance is less than the first predetermined threshold, indicating that the distance between the object and the target object is sufficiently close, and the detected object may need to use the service corresponding to the target object. For example, in the cafeteria scenario, when an object (which may be a human body such as a diner, or may be an object such as a cart for collecting residues on the dining table) approaches the target object (which is the dining table here), it indicates that a diner may need to dine at the dining table. In such case, the monitoring and detecting system can activate the image acquisition system for image acquisition, and then the recognition system performs object recognition on the acquired image, to determine whether the object approaching the dining table is the predetermined object (which is a human body here). If the object approaching the dining table is a human body, it indicates that a diner may use the dining table, and it can be understood that the target object enters an active state, and then can further enter the service system to perform a service process such as ordering. On the contrary, if the object approaching the dining table is not a human body, it indicates that no diner needs to use the dining table, and it can be understood that the target object is in an inactive state and does not need to enter the service system.

(2) A statistical value of the distance between the object and the target object within a first predetermined time period is less than a second predetermined threshold.

Due to interference from an ambient signal or an error of the ranging sensor, some burr signals may appear in the value of the distance between the detected object and the target object, affecting a judgment result. Therefore, the statistical value of the distance between the object and the target object within a certain time period (for example, the first predetermined time period) can be calculated, and the statistical value is used to reflect an overall result of the ranging within the time window (i.e., the first predetermined time period), thereby alleviating impact of the burr signals on the judgment result. Optionally, the statistical value can be an average or a medium value (also referred to as a median) of the ranging values in the first predetermined time period.

The statistical value of the distance within the first predetermined time period is less than the second predetermined threshold, which can be understood as follows: In a certain time window, the distance between the object and the target object is sufficiently close, and the detected object may need to use the service corresponding to the target object. For example, in the application scenario of a self-service cargo box, when an object (which can be a human body such as cargo box managing personnel, or may be an object such as a container) approaches the target object (which is the cargo box here), it indicates that a container may need to be loaded into the cargo box. In such case, the monitoring and detecting system can activate the image acquisition system for image acquisition, and then the recognition system performs object recognition on the acquired image, to determine whether the object approaching the cargo box is the predetermined object (which is a container here). If the object approaching the cargo box is a container, it indicates that a container needs to be loaded, and it can be understood that the target object is in an active state, and then can further enter the service system to perform a service process such as warehousing and container loading/unloading. On the contrary, if the object approaching the cargo box is not a container, it indicates that no container needs to be loaded, and it can be understood that the target object is in an inactive state and does not need to enter the service system.

(3) A difference in the distances between the object and the target object at a first predetermined time interval is greater than a third predetermined threshold.

Such predetermined condition can be understood as follows: If the distance between the detected object (which can be understood as an object within the distance detection range) and the target object is stable, and a change value within a certain time interval (e.g., the first predetermined time interval) is sufficiently small (e.g., not greater than the third predetermined threshold), it indicates that the object possibly does not move, or a range of movement does not reach a predetermined degree. In such case, it can be considered that the active/inactive state of the target object has not changed. For example, in the cafeteria scenario in which the diner approaches the dining table and sits at the dining table for dining, the distance between the diner and the dining table is usually short and largely stable. It can be understood that the dinner table will always be in the active state before the diner finishes the meal and leaves the dining table. Therefore, when the distance change between the diner and the dining table is sufficiently small, the monitoring and detecting system does not need to activate the image acquisition system for image acquisition and then determine the active/inactive state of the dining table.

Therefore, even if the distance between the detected object and the target object is sufficiently close or faraway, as long as the change value of the distance is sufficiently small, the image acquisition system may not need to be activated, the object recognition is not needed, and the service process of the service system does not need to be changed.

It can be understood that such condition can be usually used in combination with other conditions to prevent the image acquisition system from being frequently activated when the active/inactive state of the target object does not change, thus further reducing system power consumption.

(4) The distance between the object and the target object is greater than a fourth predetermined threshold.

Such predetermined condition can be understood as follows: The distance is greater than the fourth predetermined threshold, indicating that the distance between the object and the target object is sufficiently faraway, and the detected object may not need to use the service corresponding to the target object. For example, in the cafeteria scenario, when an object (which may be a human body such as a diner, or may be an object such as a cart for collecting residues on the dining table) moves away from the target object (which is the dining table here), it indicates that the diner finishes the meal and leaves the dining table. In such case, the monitoring and detecting system can activate the image acquisition system for image acquisition, and then the recognition system performs object recognition on the acquired image, to determine whether the object moving away from the dining table is the predetermined object (which is a human body here). If the object moving away from the dining table is a human body, it indicates that the diner does not need to use the dining table, and it can be understood that the target object enters an inactive state, and then can further deduct funds based on the service process corresponding to the inactive state. On the contrary, if the object moving away from the dining table is not a human body, it indicates that the diner does not leave the dining table, and it can be understood that the target object does not need to enter the service system to adjust the service process.

(5) A statistical value of the distance between the object and the target object within a second predetermined time period is greater than a fifth predetermined threshold.

By checking the statistical value of distance in the predetermined time window (equivalent to the second predetermined time period), impact of burr signals caused by the ranging sensor on the judgment result can be alleviated.

The statistical value of the distance within the second predetermined time period is greater than the fifth predetermined threshold, which can be understood as follows: In a certain time window, the distance between the object and the target object is sufficiently faraway, and the detected object may not need to use the service corresponding to the target object. Therefore, the image acquisition system can be activated for image acquisition, and then object recognition is performed based on the acquired image to determine whether the image acquisition area includes a predetermined object. If the image acquisition area still includes the predetermined object, it can be understood that the predetermined object is relatively close to the target object, and the target object is still in the active state. If the image acquisition area does not include the predetermined object, it can be understood that the predetermined object is far away from the target object, and the target object is in the inactive state.

The previously described examples include multiple cases of the first predetermined condition. It is worthwhile to note that, the first predetermined condition used when the monitoring and detecting system determines whether to activate the image acquisition system can be a combination of the previously described multiple conditions. Regardless of whether the distance change is relatively large (the distance difference is greater than a certain threshold), the distance is relatively far (the distance value is greater than a certain threshold, or the average or median in the time window is greater than a certain threshold), or the distance is relatively close (the distance value is less than a certain threshold, or the average or median in the time window is less than a certain threshold), the image acquisition system may need to be activated for image acquisition.

Optionally, the image acquisition system can be implemented by using an image acquisition apparatus such as a camera, a high definition camera, and an infrared camera. The specific types, specifications and models can be determined based on actual application scenarios, which is not limited in the implementations of the present application.

Optionally, the disposing of the image acquisition apparatus in the image acquisition system is associated with the way of disposing the ranging sensor, and there is a mapping relationship between the image acquisition system and the distance detection range of the ranging sensor. Specifically, it can be understood that there should be multiple intersections between the image acquisition range of the image acquisition system and the distance detection range of the ranging sensor. The achieved effect is as follows: When it is detected in the distance detection range that the distance between the object and the target object satisfies the first predetermined condition, the image acquisition system corresponding to the distance detection range is activated so that the image acquisition system can acquire the image in its image acquisition area. Clearly, the acquired image in the image acquisition area usually includes the detected object (unless the detected object has left the image acquisition area during image acquisition).

For example, in the cafeteria scenario shown in FIG. 3, there are multiple intersections between the distance detection range 506 of the ultrasonic ranging sensor 502 and the image acquisition area 505 of the image acquisition system 503 (which can be a camera). A preferred approach in such scenario is that the location and angle of disposing the camera should ensure that the top of the diner's head is still in the image acquisition area after the diner sits down.

Optionally, the mapping relationship between the image acquisition system and the distance detection range of the ranging sensor can be one-to-one, one-to-many, or many-to-one. The camera used in the image acquisition system can have a fixed angle, or adjustable under control of the monitoring and detecting system. For example, when detecting an object whose distance satisfies a predetermined need within the distance detection range of the ranging sensor, the ranging sensor activates the camera and controls the camera to adjust the angle until the overlap between the image acquisition area and the distance detection range of the ranging sensor satisfies a condition.

Optionally, when it is determined, based on the distance between the object and the target object, that the image acquisition system needs to be activated, the camera can be directly started and controlled to acquire an image. Alternatively, the camera can be started when a specific condition is satisfied, and the camera is in standby mode after startup; when another condition is satisfied, the camera is controlled to switch to working mode to acquire the image in the image acquisition area.

The first instruction sent by the monitoring and detecting system to the image acquisition system is used to activate the image acquisition system. After receiving the first instruction, the image acquisition system can acquire the image in the image acquisition area of the image acquisition system directly or when a specific condition is satisfied. Optionally, the image acquisition system can directly send the acquired image to the recognition system, or can return the image to the monitoring and detecting system, and the monitoring and detecting system sends the image in the image acquisition area to the recognition system for object recognition. The monitoring and detecting system can send the image in the image acquisition area to the object recognition system, so that the object recognition system performs object recognition on the image in the image acquisition area to obtain a recognition result. Then, the monitoring and detecting system receives the recognition result returned by the object recognition system, and then performs S105.

The recognition system used for object recognition can be either disposed in the local target object, or disposed as a remote cloud recognition system. With the remote cloud recognition system, multiple target objects can use the common cloud recognition system for object recognition, thus reducing the cost for disposing the whole application system.

It can be understood that the algorithms used by the recognition system for object recognition can be target detection algorithms such as universal You Only Look Once (YOLO), Fast Region-based Convolutional Neural Network (fast RCNN), and Single Shot Detector (SSD). Based on different application scenarios, recognition models for different target objects can be obtained through training by using different training images. Model construction and training are performed by using universal methods, and details are omitted here for simplicity in the implementations of the present application.

S105: Determine a state of the target object based on a recognition result obtained by performing object recognition on the image in the image acquisition area, where the state of the target object includes an active state and/or an inactive state.

Optionally, the recognition result can include at least one of the following: a judgment conclusion indicating whether the image in the image acquisition area includes a predetermined object; or the quantity of predetermined objects included in the image in the image acquisition area.

Based on different content of the recognition result, S105 of determining a state of the target object based on a recognition result obtained by performing object recognition on the image in the image acquisition area can include at least one of the following: when the image in the image acquisition area includes the predetermined object, determining that the state of the target object is the active state; when the image in the image acquisition area does not include the predetermined object, determining that the state of the target object is the inactive state; when the quantity of the predetermined objects included in the image in the image acquisition area is greater than zero, determining that the state of the target object is the active state; or when the quantity of the predetermined objects included in the image in the image acquisition area is zero, determining that the state of the target object is the inactive state.

It can be understood that, when monitoring the distance, the monitoring and detecting system determines whether to activate the image acquisition system only based on the distance between the object and the target object, without distinguishing the specific type of the object. After acquiring the image in the image acquisition area, the image acquisition system can further determine whether the state of the target object is the active state or the inactive state, based on whether the image includes the predetermined object and/or the quantity of the predetermined objects included in the image. On this basis, the state of the target object can be sent to a service system, so that the service system determines a service process corresponding to the state of the target object.

To further reduce the power consumption brought by the image acquisition system, after acquiring the image and determining the state of the target object, the monitoring and detecting system can send a second instruction to the image acquisition system corresponding to the distance detection range, so as to shut down the image acquisition system or switch the image acquisition system to a standby mode.

In addition, the second instruction can be sent when the distance between the detected object and the target object tends to be stable. The second instruction can be sent to the image acquisition system corresponding to the distance detection range when the distance between the object and the target object satisfies a second predetermined condition. The second predetermined condition includes the following: A difference in the distances between the object and the target object at a second predetermined time interval is less than a sixth predetermined threshold.

Optionally, after the state of the target object is determined, the state of the target object can be further recorded, and the first predetermined condition for determining whether to activate the image acquisition system can be further determined based on the current state of the target object. It can be understood that the monitoring and detecting system only needs to check whether there is an object that may change the state of the target object. As such, only the condition that may change the state of the target object needs to be selected as the first predetermined condition for determining whether to activate the image acquisition system.

For example, when the recorded current state of the target object is an active state, it is only necessary to check whether there is a condition that may change the state of the target object to the inactive state. In such case, the first predetermined condition can be at least one of the following: a difference in the distances between the object and the target object at a first predetermined time interval is greater than a third predetermined threshold; the distance between the object and the target object is greater than a fourth predetermined threshold; or a statistical value of the distance between the object and the target object within a second predetermined time period is greater than a fifth predetermined threshold.

For another example, when the recorded current state of the target object is an inactive state, it is only necessary to check whether there is a condition that may change the state of the target object to the active state. In such case, the first predetermined condition can be at least one of the following: the distance between the object and the target object is less than a first predetermined threshold; a statistical value of the distance between the object and the target object within a first predetermined time period is less than a second predetermined threshold; or a difference in the distances between the object and the target object at a first predetermined time interval is greater than a third predetermined threshold.

In the implementations of the present application, the image acquisition system can obtain the image in the image acquisition area, and then perform object recognition on the acquired image, so as to determine the state of the target object based on the recognition result. Therefore, whether a predetermined object is active and/or inactive can be accurately determined. In addition, the distance between the object within the distance detection range and the target object is monitored, and the image acquisition system is activated to obtain the image in the image acquisition area of the image acquisition system only when the detected distance satisfies the first predetermined condition. As such, system power consumption can be effectively reduced, and application needs can be satisfied.

Figure 4:
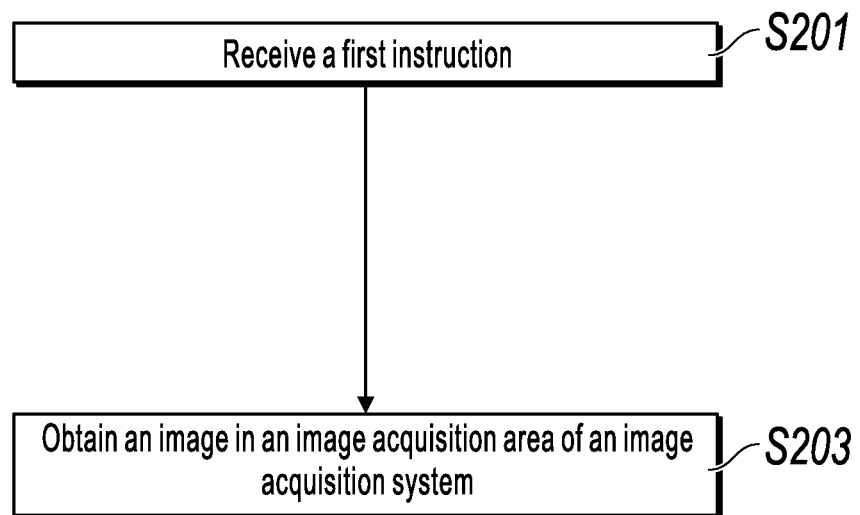
FIG. 4 is a schematic flowchart illustrating an active/inactive state detection method performed by an image acquisition system, according to an implementation of the present application.

Referring to FIG. 4, an implementation of the present application further provides an active/inactive state detection method, where the method is performed by an image acquisition system, and can include the following:

S201: Receive a first instruction, where the first instruction is sent by a monitoring and detecting system when a distance between an object and a target object satisfies a first predetermined condition, the object is within a distance detection range of the monitoring and detecting system, and the distance detection range corresponds to the image acquisition system.

S203: Obtain an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

Optionally, after obtaining the image in the image acquisition area of the image acquisition system, the image acquisition system can further perform the following steps: receiving a second instruction, where the second instruction is sent by the monitoring and detecting system after determining the state of the target object; and shutting down the image acquisition system or switching the image acquisition system to a standby mode based on the second instruction.

It can be understood that the steps performed by the image acquisition system correspond to the previously described steps performed by the application system or the monitoring and detecting system, and the content related to the image acquisition system in the previously described implementations is applicable to the present implementation. Details are omitted here for simplicity.

In the implementations of the present application, the image acquisition system can obtain the image in the image acquisition area, and then perform object recognition on the acquired image, so as to determine the state of the target object based on the recognition result. Therefore, whether a predetermined object is active and/or inactive can be accurately determined. In addition, the distance between the object within the distance detection range and the target object is monitored, and the image acquisition system is activated to obtain the image in the image acquisition area of the image acquisition system only when the detected distance satisfies the first predetermined condition. As such, system power consumption can be effectively reduced, and application needs can be satisfied.

For example, in the application scenario in which the active/inactive state detection method provided in the implementations of the present application is applied to the cafeteria, the target object is the dining table, and the service system can be a multimedia interaction system. The interaction system can mainly include a movement collector, a data processor, and a display screen. Optionally, a hardware carrier of the interaction system can be disposed at a place that facilitates the diner's operation and viewing around the dining table. Alternatively, the common dining table can be directly used as a carrier of the display screen. The movement collector such as a touchscreen and a gesture recognition apparatus that can detect the user's (i.e., the diner's) operations is deployed on the common dining table, and the dining tabletop is used as the screen display to feed back the data processing result of the interaction system, so as to implement intelligence of the dining table and complete interaction between the diner and the service system by using the intelligent dining table.

When the target object (which is the intelligent dining table here) is in the active state, the service system can start the ordering process. The menu can be displayed on the touchscreen embedded into the tabletop. The diner can perform a series of operations such as selecting corresponding dishes, completing self-service ordering, and adding dishes by tapping the touchscreen, and can even view the real-time progress of the dishes, view the cooking process of the dishes, and so on by using the screen. In addition, the intelligent dining table can record the diner's identification information and frequently ordered dishes, and can recommend personalized information to the diner later.

When the target object (which is the intelligent dining table here) is in the inactive state, the service system can start the funds deduction process. The service system can turn off the touchscreen, and can automatically deduct funds based on the bill amount of the diner, and the identification information (e.g., the account number, identity ID, etc.) previously provided by the diner. In addition, the service system can start the reminding process, for example, reminding service personnel to clean the dining table.

Figure 5:
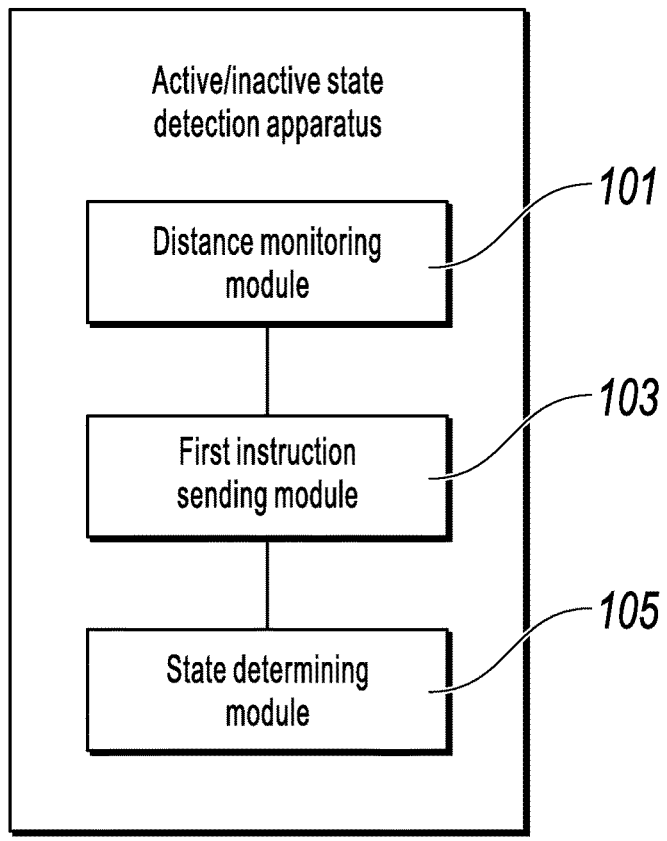
FIG. 5 is a schematic structural diagram illustrating an active/inactive state detection apparatus applied to a monitoring and detecting system, according to an implementation of the present application.

An implementation of the present application further provides an active/inactive state detection apparatus, where the apparatus is applied to a monitoring and detecting system 100, and as shown in FIG. 5, the apparatus includes the following: a distance monitoring module 101, configured to monitor a distance between an object and a target object within a distance detection range; a first instruction sending module 103, configured to: when the distance between the object and the target object satisfies a first predetermined condition, send a first instruction to an image acquisition system corresponding to the distance detection range, so as to activate the image acquisition system to obtain an image in an image acquisition area of the image acquisition system; and a state determining module 105, configured to determine a state of the target object based on a recognition result obtained by performing object recognition on the image in the image acquisition area, where the state of the target object includes an active state and/or an inactive state.

The active/inactive state detection apparatus in the present implementation corresponds to the active/inactive state detection method performed by the monitoring and detecting system in the previously described implementation. Related content in the previously described implementation is applicable to the present implementation, and details are omitted here for simplicity.

Figure 6:
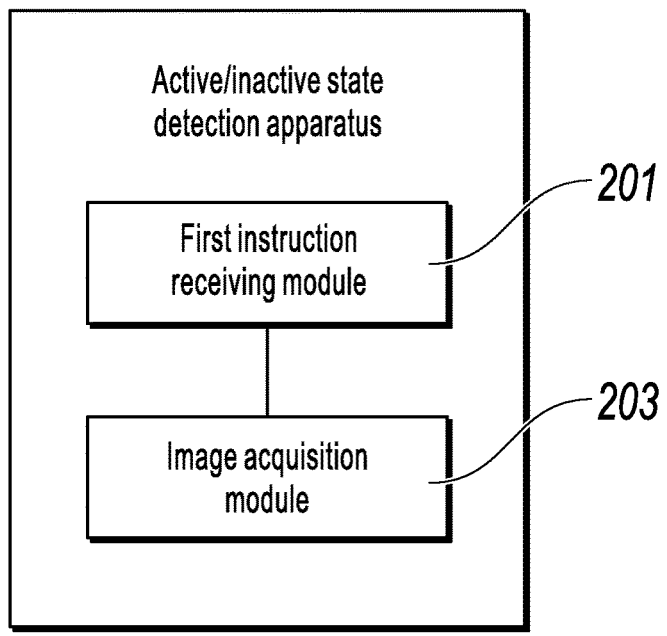
FIG. 6 is a schematic structural diagram illustrating an active/inactive state detection apparatus applied to an image acquisition system, according to an implementation of the present application.

An implementation of the present application further provides an active/inactive state detection apparatus, where the apparatus is applied to an image acquisition system 200, and as shown in FIG. 6, the apparatus includes the following: a first instruction receiving module 201, configured to receive a first instruction that is sent by a monitoring and detecting system when a distance between an object and a target object satisfies a first predetermined condition, where the object is within a distance detection range of the monitoring and detecting system, and the distance detection range corresponds to the image acquisition system; and an image acquisition module 203, configured to obtain an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

The active/inactive state detection apparatus in the present implementation corresponds to the active/inactive state detection method performed by the image acquisition system in the previously described implementation. Related content in the previously described implementation is applicable to the present implementation, and details are omitted here for simplicity.

Figure 7:
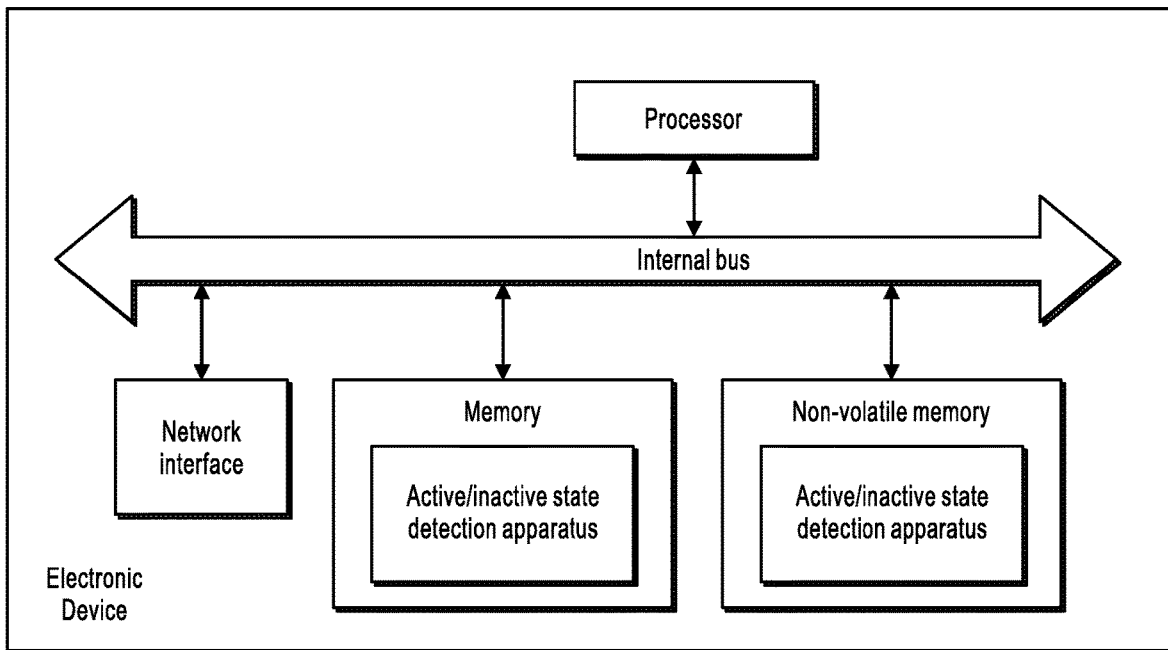
FIG. 7 is a schematic structural diagram illustrating an electronic device, according to an implementation of the present application.

FIG. 7 is a schematic structural diagram illustrating an electronic device, according to an implementation of the present application. Referring to FIG. 7, in terms of hardware, the electronic device includes a processor, and optionally further includes an internal bus, a network interface, and a memory. The memory may include a storage such as a high-speed random access memory (RAM), or may further include a non-volatile memory such as at least one magnetic disk storage. Certainly, the electronic device may further include hardware needed for other services.

The processor, the network interface, and the memory can be interconnected by using the internal bus. The internal bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of representation, the bus is represented by using only one double-headed arrow in FIG. 7. However, it does not mean that there is only one bus or only one type of bus.

The memory is configured to store a program. The program can include program code, and the program code includes a computer operation instruction. The memory can include a storage and a non-volatile memory, and provide an instruction and data for the processor.

The processor reads a corresponding computer program from the non-volatile memory to the storage and then runs the computer program to form an active/inactive state detection apparatus at the logic level. The processor executes the program stored in the memory, and is configured to perform the following operations: monitoring a distance between an object and a target object within a distance detection range; when the distance between the object and the target object satisfies a first predetermined condition, sending a first instruction to an image acquisition system corresponding to the distance detection range, so as to activate the image acquisition system to obtain an image in an image acquisition area of the image acquisition system; and determining a state of the target object based on a recognition result obtained by performing object recognition on the image in the image acquisition area, where the state of the target object includes an active state and/or an inactive state.

The previously described method performed by the active/inactive state detection apparatus disclosed in the implementation shown in FIG. 2 of the present application can be applied to the processor or implemented by the processor. The processor may be an integrated circuit chip with a signal processing capability. In an implementation process, the steps of the previously described method can be implemented by using a hardware integrated logic circuit in the processor, or by using instructions in a form of software. The processor can be a general-purpose processor, including a central processing unit (CPU), a network processor (NP), etc.; or can be a digital signal processor (DSP), an application-specific integrated circuit (ASIC), a field-programmable gate array (FPGA) or other programmable logic devices, a discrete gate or transistor logic device, or a discrete hardware component. The processor can implement or perform the methods, the steps, and the logical block diagrams that are disclosed in the implementations of the present application. The general-purpose processor can be a microprocessor or the processor can be any conventional processors, etc. The steps of the methods disclosed with reference to the implementations of the present application can be directly performed and completed by a hardware decoding processor, or can be performed and completed by using a combination of hardware in a decoding processor and a software module. The software module can be located in a known storage medium in the art, such as a random access memory, a flash memory, a read-only memory, a programmable read-only memory, an electrically erasable programmable memory, or a register. The storage medium is located in the memory, and the processor reads information in the memory and completes the steps of the previously described methods in combination with hardware in the processor.

The electronic device can further perform the method performed by the active/inactive state detection apparatus in FIG. 1, and implement the functions of the active/inactive state detection apparatus in the implementation shown in FIG. 1. Details are omitted here for simplicity in the implementations of the present application.

An implementation of the present application further provides a computer readable storage medium. The computer readable storage medium stores one or more programs, and the one or more programs include an instruction. When the instruction is executed by an electronic device that includes multiple applications, the electronic device is enabled to perform the method performed by the active/inactive state detection apparatus in the implementation shown in FIG. 1, and is configured to perform the following operations: monitoring a distance between an object and a target object within a distance detection range; when the distance between the object and the target object satisfies a first predetermined condition, sending a first instruction to an image acquisition system corresponding to the distance detection range, so as to activate the image acquisition system to obtain an image in an image acquisition area of the image acquisition system; and determining a state of the target object based on a recognition result obtained by performing object recognition on the image in the image acquisition area, where the state of the target object includes an active state and/or an inactive state.

In the implementations of the present application, the image acquisition system can obtain the image in the image acquisition area, and then perform object recognition on the acquired image, so as to determine the state of the target object based on the recognition result. Therefore, whether a predetermined object is active and/or inactive can be accurately determined. In addition, the distance between the object within the distance detection range and the target object is monitored, and the image acquisition system is activated to obtain the image in the image acquisition area of the image acquisition system only when the detected distance satisfies the first predetermined condition. As such, system power consumption can be effectively reduced, and application needs can be satisfied.

Figure 8:
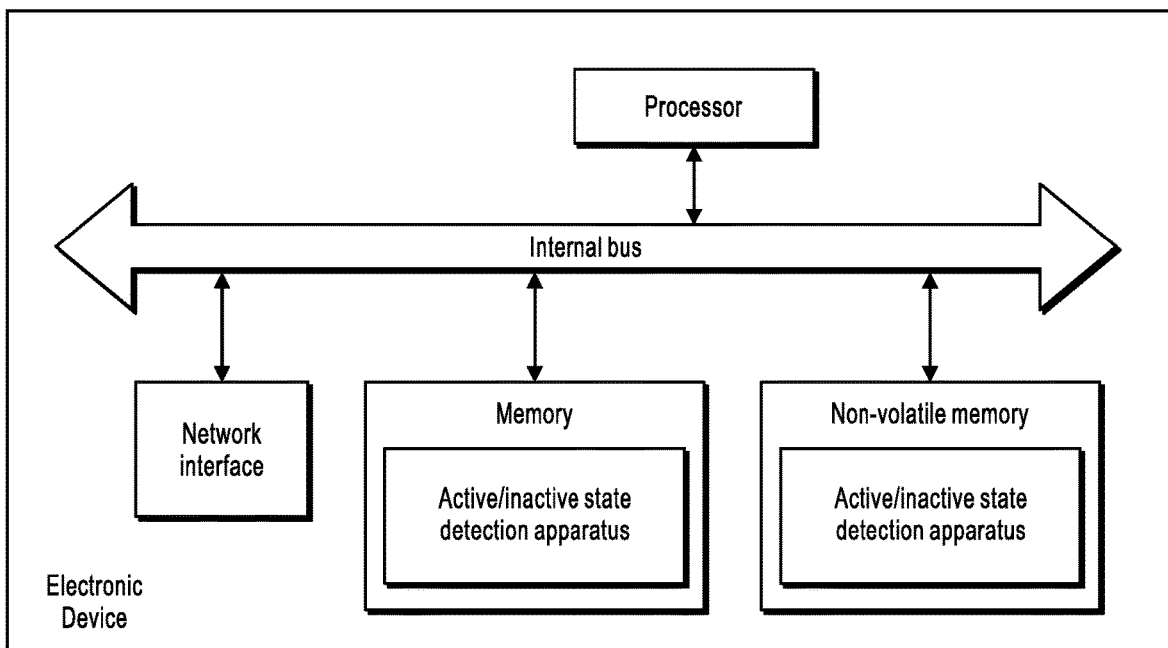
FIG. 8 is a schematic structural diagram illustrating another electronic device, according to an implementation of the present application.
Figure 9:
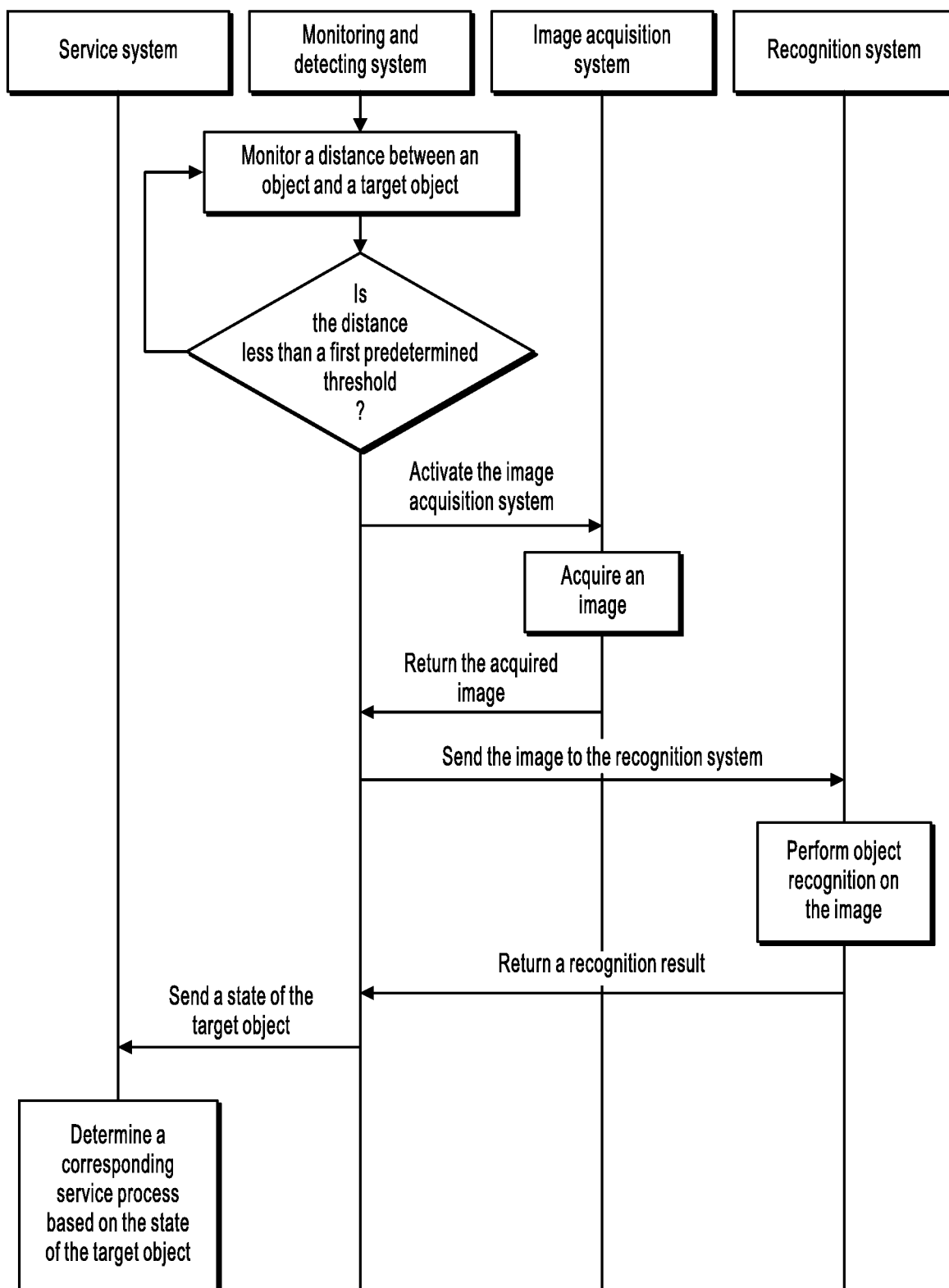
FIG. 9 is a schematic flowchart illustrating an active/inactive state detection method for an application system, according to an implementation of the present application.

FIG. 8 is a schematic structural diagram illustrating an electronic device, according to an implementation of the present application. Referring to FIG. 8, in terms of hardware, the electronic device includes a processor, and optionally further includes an internal bus, a network interface, and a memory. The memory may include a storage such as a high-speed random access memory (RAM), or may further include a non-volatile memory such as at least one magnetic disk storage. Certainly, the electronic device may further include hardware needed for other services.

The processor, the network interface, and the memory can be interconnected by using the internal bus. The internal bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of representation, the bus is represented by using only one double-headed arrow in FIG. 8. However, it does not mean that there is only one bus or only one type of bus.

The memory is configured to store a program. The program can include program code, and the program code includes a computer operation instruction. The memory can include a storage and a non-volatile memory, and provide an instruction and data for the processor.

The processor reads a corresponding computer program from the non-volatile memory to the storage and then runs the computer program to form an active/inactive state detection apparatus at the logic level. The processor executes the program stored in the memory, and is configured to perform the following operations: receiving a first instruction, where the first instruction is sent by a monitoring and detecting system when a distance between an object and a target object satisfies a first predetermined condition, the object is within a distance detection range of the monitoring and detecting system, and the distance detection range corresponds to the image acquisition system; and obtaining an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

The previously described method performed by the active/inactive state detection apparatus disclosed in the implementation shown in FIG. 4 of the present application can be applied to the processor or implemented by the processor. The processor may be an integrated circuit chip with a signal processing capability. In an implementation process, the steps of the previously described method can be implemented by using a hardware integrated logic circuit in the processor, or by using instructions in a form of software. The processor can be a general-purpose processor, including a central processing unit (CPU), a network processor (NP), etc.; or can be a digital signal processor (DSP), an application-specific integrated circuit (ASIC), a field-programmable gate array (FPGA) or other programmable logic devices, a discrete gate or transistor logic device, or a discrete hardware component. The processor can implement or perform the methods, the steps, and the logical block diagrams that are disclosed in the implementations of the present application. The general-purpose processor can be a microprocessor or the processor can be any conventional processors, etc. The steps of the methods disclosed with reference to the implementations of the present application can be directly performed and completed by a hardware decoding processor, or can be performed and completed by using a combination of hardware in a decoding processor and a software module. The software module can be located in a known storage medium in the art, such as a random access memory, a flash memory, a read-only memory, a programmable read-only memory, an electrically erasable programmable memory, or a register. The storage medium is located in the memory, and the processor reads information in the memory and completes the steps of the previously described methods in combination with hardware in the processor.

The electronic device can further perform the method performed by the active/inactive state detection apparatus in FIG. 4, and implement the functions of the active/inactive state detection apparatus in the implementation shown in FIG. 4. Details are omitted here for simplicity in the implementations of the present application.

An implementation of the present application further provides a computer readable storage medium. The computer readable storage medium stores one or more programs, and the one or more programs include an instruction. When the instruction is executed by an electronic device that includes multiple applications, the electronic device is enabled to perform the method performed by the active/inactive state detection apparatus in the implementation shown in FIG. 4, and is configured to perform the following operations: receiving a first instruction, where the first instruction is sent by a monitoring and detecting system when a distance between an object and a target object satisfies a first predetermined condition, the object is within a distance detection range of the monitoring and detecting system, and the distance detection range corresponds to the image acquisition system; and obtaining an image in an image acquisition area of the image acquisition system, so that the monitoring and detecting system determines a state of the target object based on a recognition result obtained by performing object recognition on the image in the image acquisition area, where the state of the target object includes an active state and/or an inactive state.

In the implementations of the present application, the image acquisition system can obtain the image in the image acquisition area, and then perform object recognition on the acquired image, so as to determine the state of the target object based on the recognition result. Therefore, whether a predetermined object is active and/or inactive can be accurately determined. In addition, the distance between the object within the distance detection range and the target object is monitored, and the image acquisition system is activated to obtain the image in the image acquisition area of the image acquisition system only when the detected distance satisfies the first predetermined condition. As such, system power consumption can be effectively reduced, and application needs can be satisfied.

An implementation of the present application further provides an application system, including a monitoring and detecting system, an image acquisition system, an object recognition system, and a service system.

The monitoring and detecting system is configured to: monitor a distance between an object and a target object within a distance detection range; when the distance between the object and the target object satisfies a first predetermined condition, send a first instruction to an image acquisition system corresponding to the distance detection range, so as to activate the image acquisition system to obtain an image in an image acquisition area of the image acquisition system; and determine a state of the target object based on a recognition result obtained by performing object recognition on the image in the image acquisition area, where the state of the target object includes an active state and/or an inactive state.

The image acquisition system is configured to: receive a first instruction, where the first instruction is sent by the monitoring and detecting system when the distance between the object and the target object satisfies the first predetermined condition, the object is within the distance detection range of the monitoring and detecting system, and the distance detection range corresponds to the image acquisition system; and obtain the image in the image acquisition area of the image acquisition system, so that the monitoring and detecting system determines the state of the target object based on the recognition result obtained by performing object recognition on the image in the image acquisition area, where the state of the target object includes the active state and/or the inactive state.

The object recognition system is configured to: receive the image in the image acquisition area and perform object recognition on the image in the image acquisition area to obtain the recognition result; and return the recognition result.

The service system is configured to receive the state of the target object and determine a service process corresponding to the state of the target object.

The present application is described with reference to the flowcharts and/or block diagrams of the method, the device (system), and the computer program product according to the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer usable program code.

The previous descriptions are merely better implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method for state detection, comprising:
    monitoring, as a monitored distance, a distance between an object and a target object within a distance detection range;
    when the monitored distance satisfies a first predetermined condition, sending a first instruction to an image acquisition system corresponding to the distance detection range, so as to activate the image acquisition system to obtain an image in an image acquisition area of the image acquisition system;
    determining a state of the target object based on a recognition result obtained by performing object recognition on the image in the image acquisition area, wherein the state of the target object comprises an active state or an inactive state;
    after determining the state of the target object, monitoring the monitored distance; and
    when the monitored distance satisfies a second predetermined condition, sending a second instruction to the image acquisition system corresponding to the distance detection range, so as to shut down the image acquisition system or switch the image acquisition system to a standby mode, wherein the second predetermined condition comprises:

a change in the monitored distance during a second predetermined time interval is less than a sixth predetermined threshold.

2. The computer-implemented method of claim 1, wherein the first predetermined condition comprises at least one of:
the monitored distance is less than a first predetermined threshold;
a statistical value of the monitored distance within a first predetermined time period is less than a second predetermined threshold;
a difference in a plurality of monitored distances at a first predetermined time interval is greater than a third predetermined threshold;
the monitored distance is greater than a fourth predetermined threshold; or
a statistical value of the monitored distance within a second predetermined time period is greater than a fifth predetermined threshold.

3. The computer-implemented method of claim 1, wherein, before determining a state of the target object:
sending the image in the image acquisition area to an object recognition system, so that the object recognition system performs object recognition on the image in the image acquisition area to obtain the recognition result; and
receiving the recognition result returned by the object recognition system.

4. The computer-implemented method of claim 3, wherein the object recognition system is a cloud object recognition system.

5. The computer-implemented method of claim 3, wherein the recognition result comprises at least one of:
a determination whether the image in the image acquisition area comprises a predetermined object; or
a quantity of predetermined objects that the image in the image acquisition area is comprised of.

6. The computer-implemented method of claim 5, wherein determining a state of the target object comprises at least one of:
when the image in the image acquisition area comprises the predetermined object, determining that the state of the target object is the active state;
when the image in the image acquisition area does not comprise the predetermined object, determining that the state of the target object is the inactive state;
when the quantity of predetermined objects is greater than zero, determining that the state of the target object is the active state; or
when the quantity of predetermined objects is zero, determining that the state of the target object is the inactive state.

7. The computer-implemented method of claim 1, further comprising, after determining a state of the target object:
sending the state of the target object to a service system, where the service system determines a service process corresponding to the state of the target object.

8. The computer-implemented method of claim 1, further comprising, after determining a state of the target object:
recording the state of the target object; and
determining the first predetermined condition based on the state of the target object.

9. A non-transitory, computer-readable medium storing one or more instructions executable by a computer system to perform operations comprising:
monitoring, as a monitored distance, a distance between an object and a target object within a distance detection range;
when the monitored distance satisfies a first predetermined condition, sending a first instruction to an image acquisition system corresponding to the distance detection range, so as to activate the image acquisition system to obtain an image in an image acquisition area of the image acquisition system;
determining a state of the target object based on a recognition result obtained by performing object recognition on the image in the image acquisition area, wherein the state of the target object comprises an active state or an inactive state;
after determining the state of the target object, monitoring the monitored distance; and
when the monitored distance satisfies a second predetermined condition, sending a second instruction to the image acquisition system corresponding to the distance detection range, so as to shut down the image acquisition system or switch the image acquisition system to a standby mode, wherein the second predetermined condition comprises:
a change in the monitored distance during a second predetermined time interval is less than a sixth predetermined threshold.

10. The non-transitory, computer-readable medium of claim 9, wherein the first predetermined condition comprises at least one of:
the monitored distance is less than a first predetermined threshold;
a statistical value of the monitored distance within a first predetermined time period is less than a second predetermined threshold;
a difference in a plurality of monitored distances at a first predetermined time interval is greater than a third predetermined threshold;
the monitored distance is greater than a fourth predetermined threshold; or
a statistical value of the monitored distance within a second predetermined time period is greater than a fifth predetermined threshold.

11. The non-transitory, computer-readable medium of claim 9, wherein, before determining a state of the target object:
sending the image in the image acquisition area to an object recognition system, so that the object recognition system performs object recognition on the image in the image acquisition area to obtain the recognition result; and
receiving the recognition result returned by the object recognition system.

12. The non-transitory, computer-readable medium of claim 11, wherein the object recognition system is a cloud object recognition system.

13. The non-transitory, computer-readable medium of claim 11, wherein the recognition result comprises at least one of:
a determination whether the image in the image acquisition area comprises a predetermined object; or
a quantity of predetermined objects that the image in the image acquisition area is comprised of.

14. The non-transitory, computer-readable medium of claim 13, wherein determining a state of the target object comprises at least one of:

when the image in the image acquisition area comprises the predetermined object, determining that the state of the target object is the active state;

when the image in the image acquisition area does not comprise the predetermined object, determining that the state of the target object is the inactive state;

when the quantity of predetermined objects is greater than zero, determining that the state of the target object is the active state; or when the quantity of predetermined objects is zero, determining that the state of the target object is the inactive state.

15. The non-transitory, computer-readable medium of claim 9, further comprising, after determining a state of the target object:

sending the state of the target object to a service system, where the service system determines a service process corresponding to the state of the target object.

16. The non-transitory, computer-readable medium of claim 9, further comprising, after determining a state of the target object:

recording the state of the target object; and determining the first predetermined condition based on the state of the target object.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

monitoring, as a monitored distance, a distance between an object and a target object within a distance detection range;

when the monitored distance satisfies a first predetermined condition, sending a first instruction to an image acquisition system corresponding to the distance detection range, so as to activate the image acquisition system to obtain an image in an image acquisition area of the image acquisition system;

determining a state of the target object based on a recognition result obtained by performing object recognition on the image in the image acquisition area, wherein the state of the target object comprises an active state or an inactive state;

after determining the state of the target object, monitoring the monitored distance; and when the monitored distance satisfies a second predetermined condition, sending a second instruction to the image acquisition system corresponding to the distance detection range, so as to shut down the image acquisition system or switch the image acquisition system to a standby mode, wherein the second predetermined condition comprises:

a change in the monitored distance during a second predetermined time interval is less than a sixth predetermined threshold.

18. The computer-implemented system of claim 17, wherein the first predetermined condition comprises at least one of:

the monitored distance is less than a first predetermined threshold;

a statistical value of the monitored distance within a first predetermined time period is less than a second predetermined threshold;

a difference in a plurality of monitored distances at a first predetermined time interval is greater than a third predetermined threshold;

the monitored distance is greater than a fourth predetermined threshold; or a statistical value of the monitored distance within a second predetermined time period is greater than a fifth predetermined threshold.

19. The computer-implemented system of claim 17, wherein, before determining a state of the target object:

sending the image in the image acquisition area to an object recognition system, so that the object recognition system performs object recognition on the image in the image acquisition area to obtain the recognition result; and receiving the recognition result returned by the object recognition system.

20. The computer-implemented system of claim 19, wherein the object recognition system is a cloud object recognition system.

21. The computer-implemented system of claim 19, wherein the recognition result comprises at least one of:

a determination whether the image in the image acquisition area comprises a predetermined object; or a quantity of predetermined objects that the image in the image acquisition area is comprised of.

22. The computer-implemented system of claim 21, wherein determining a state of the target object comprises at least one of:

when the image in the image acquisition area comprises the predetermined object, determining that the state of the target object is the active state;

when the image in the image acquisition area does not comprise the predetermined object, determining that the state of the target object is the inactive state;

when the quantity of predetermined objects is greater than zero, determining that the state of the target object is the active state; or when the quantity of predetermined objects is zero, determining that the state of the target object is the inactive state.

23. The computer-implemented system of claim 17, further comprising, after determining a state of the target object:

sending the state of the target object to a service system, where the service system determines a service process corresponding to the state of the target object.

24. The computer-implemented system of claim 17, further comprising, after determining a state of the target object:

recording the state of the target object; and determining the first predetermined condition based on the state of the target object.

* * * * *